United States Patent [19]

Cabbiness et al.

[11] 4,267,445
[45] May 12, 1981

[54] URANIUM PROSPECTING METHOD

[75] Inventors: Dale K. Cabbiness; Alfred B. Carel; W. Dean Leslie, all of Ponca City, Okla.

[73] Assignee: Conoco, Inc., Ponca City, Okla.

[21] Appl. No.: 966,536

[22] Filed: Dec. 4, 1978

[51] Int. Cl.³ ........................... G01V 5/00; G01T 1/11
[52] U.S. Cl. ..................................... 250/255; 250/337
[58] Field of Search ................. 250/253, 255, 336, 337

[56] References Cited

U.S. PATENT DOCUMENTS

| 2,775,710 | 12/1956 | Ludeman | 250/337 |
| 2,899,558 | 8/1959 | Lewis | 250/255 |
| 4,156,138 | 5/1979 | Felice | 250/337 |

Primary Examiner—Davis L. Willis
Assistant Examiner—Janice A. Howell
Attorney, Agent, or Firm—Richard W. Collins

[57] ABSTRACT

A technique of applying the thermoluminescence phenomenon to uranium prospecting. The thermoluminescence of specimens of quartz isolated from field samples is measured. The samples are then irradiated at several levels, and the thermoluminescence of the samples is measured at the various levels. This enables a determination of the natural radiation received by the samples. The current radiation from the samples is measured with a dosimeter, and by using both shielded and unshielded dosimeters the type of radiation from the samples can be determined. Knowledge of the total natural radiation received by a sample and the current rate of radioactivity allows the determination of the present position of uranium or other radioactive source and its geological "migration" path.

5 Claims, 2 Drawing Figures

URANIUM PROSPECTING METHOD

BACKGROUND OF THE INVENTION

1. Field of the Invention

This invention relates to a method of prospecting for uranium or other radioactive material, and more particularly to a prospecting method utilizing the thermoluminescence phenomenon.

Thermoluminescence is the release of light from a crystalline material as it is heated. The light is proportional to the previous nuclear radiation dosage the material has received. Once the thermoluminescence light is produced, the previous radiation history of the material is erased, as the thermocycling performs a destructive readout of the sample's past history.

2. Description of the Prior Art

An article entitled "Thermoluminescence: Theory and Applications", by Donald E. Lancaster appears in the March, 1969 issue of *Electronics World*. This article describes the thermoluminescence phenomenon in detail, including a listing of various materials which exhibit thermoluminescence. The thermoluminescence phenomenon has been utilized in geophysical exploration. U.S. Pat. No. 2,775,710 describes a method of geophysical exploration in which thermoluminescence bodies or dosimeters are placed in a pattern over a geological formation and allowed to accumulate natural radiation. The dosimeters are then analyzed to determine the extent of radiation activity at each location. U.S. Pat. No. 2,899,558 describes a method of geophysical exploration in which formation samples are heated to produce thermoluminescence which exposes a light-sensitive medium. The exposed light-sensitive medium is then analyzed to characterize the formation.

SUMMARY OF THE INVENTION

The present invention involves a procedure for mapping the present position and the migration path of uranium or other radioactive material. The procedure involves obtaining a plurality of field samples from a geometric pattern over the surface of the ground. Specimens of quartz or other material exhibiting the thermoluminescence phenomenon are then isolated from the field samples and a thermoluminescence curve is run for the specimens. The specimens are then irradiated at several known levels of radiation, and additional thermoluminescence curves are obtained at each radiation level. From these curves, the amount of natural radiation received by the specimens is determined by comparison of the thermoluminescence curve of the natural specimens against the plurality of curves obtained after subjecting the specimens to known levels of radiation.

The present rate of radioactivity for the samples is then determined by placing radiation dosimeters either in the field on a pattern comparable to the pattern used to obtain the field samples, or alternatively the dosimeters may be placed in the samples themselves. The thermoluminescence from the dosimeters is then measured to obtain a value for the present radioactivity of the samples.

The total amount of present radioactivity from the samples and the amount of gamma radiation can be determined by using both an unshielded and a shielded dosimeter at each field location or in each field sample. The shielded dosimeter will exclude the alpha and beta radiation while allowing the gamma radiation to be measured.

The above steps provide information for each sample point regarding the total lifetime dose of radiation, the present total rate of activity, and the present rate of gamma activity of each sample. This information makes it possible to correlate present activity with historical activity to determine or direct further prospecting activities.

DESCRIPTION OF THE PREFERRED EMBODIMENT

The process of the invention will now be described for a hypothetical situation. The hypothetical situation is illustrated in FIGS. 1 and 2 of the drawings.

Figure 1:
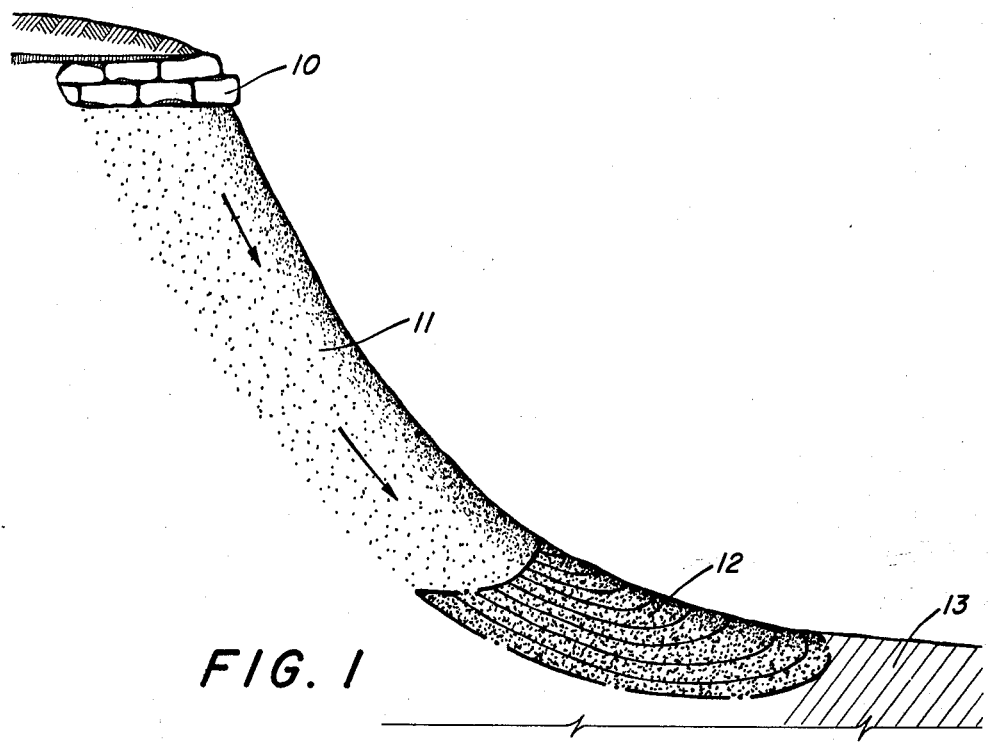
FIG. 1 is a side profile showing a uranium deposit.

FIG. 1 shows an idealized roll front for a source of uranium. The uranium originally came from an outcrop 10 on a higher elevation and migrated through a sedimentary formation 11 to its present position 12. There are two possibilities for the process of this migration. One is that the uranium moved from outcrop 10 to its present position 12 rapidly in geological time and that the sedimentary formation 11 through which it moved was exposed to radiation for only a relatively short period of time. The second is that the migration process was gradual and is still occurring, and that the time the roll front was in any one place within sedimentary formation 11 was long enough to produce significant radiation of the material therein.

Figure 2:
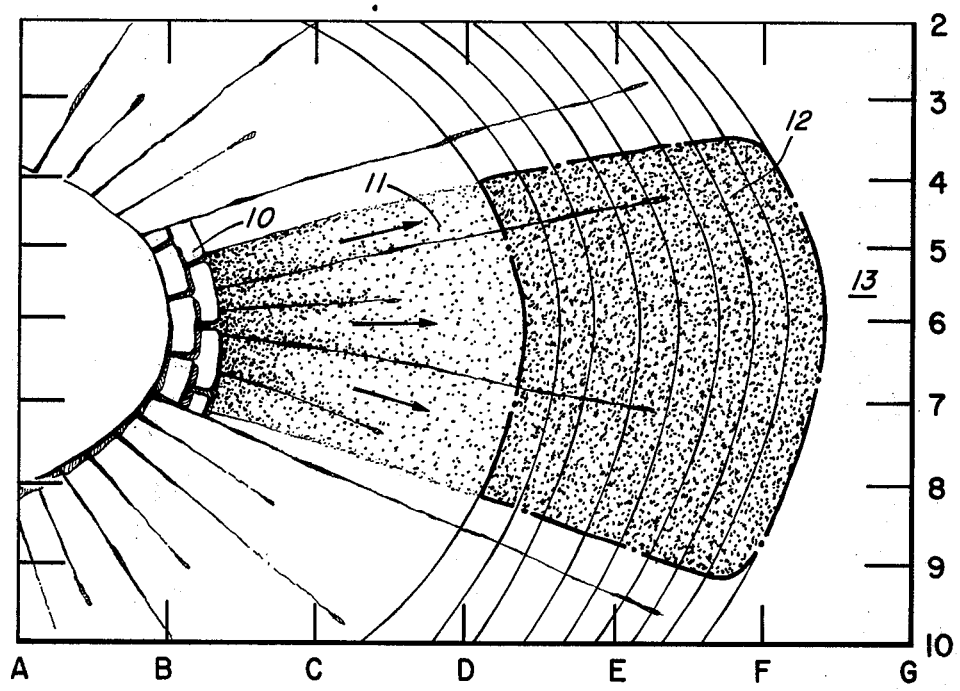
FIG. 2 is a top plan view of the uranium deposit of FIG. 1.

FIG. 2 is a plan view of the same ore deposit shown in FIG. 1. The area 13 beyond the present position 12 of the uranium may be the same type of formation as that containing the uranium. Preferably, field samples are collected from the formation on a reasonable grid coordinate such as shown in FIG. 2. These samples are then brought to the laboratory where they are dried without heating so that the natural thermoluminescence present in the samples will not be destroyed. A portion of each sample is pulverized and quartz crystals therefrom are collected such as by magnetic separation. These quartz crystals are then read on a thermoluminescence instrument to obtain a natural thermoluminescence curve. The crystals are then irradiated at a plurality of radiation levels and additional thermoluminescent curves obtained in order to calibrate the crystals to allow determination of the total lifetime dose that the quartz crystals had received naturally.

The method of this invention, wherein the natural radiation is determined quantitatively by running a thermoluminescence curve on natural samples followed by irradiating the samples at several levels of radiation, running thermoluminescence curves at these known levels of radiation, and comparing the natural curve with the known curves to obtain a precise value for the total radiation, provides a much better indication of the actual condition than when samples are merely measured for radiation and qualitatively compared one to another to determine the radiation history of the samples.

Calibrated radiation dosimeters such as lithium chloride dosimeters specifically processed for thermoluminescence determination, both shielded and unshielded, are then placed in each of the samples, or alternatively in the field at each sample location, to measure the present radiation activity for the samples. These dosimeters will then be read to determine the actual radiation picked up from the samples. By knowing the time that the dosimeters are in the sample, the radiation dose rate can easily be calculated, such as in roentgens per hour. The shielded dosimeters will only indicate gamma ray activity, and from the shielded and unshielded dosimeters it is possible to calculate the rate of gamma ray radiation from the source as well as the rate of alpha and beta ray radiation. The dosimeters may have as thermoluminescent material lithium fluoride, calcium sulfate, potassium sulfate, calcium fluoride, lithium borate or other material exhibiting thermoluminescence, and the shielding may be a millimeter thickness of aluminum.

The present invention is useful in indicating whether radiation in a particular sample is from uranium or from some other less desirable radioactive source. It is possible that daughter products from the uranium could be left in the migration pathway and not be detectably present in the roll front. That situation could occur if the time frame for the migration is slow with respect to geologic time. The indication of a high total dose rate for the quartz crystals will indicate either the present position for the uranium or the previous exposure of the quartz crystals to radiation. The absence of thermoluminescence in the quartz crystals would indicate the absence of exposure to radiation. By utilizing this information, the present position of a radiating ore body can be detected and its migration pathway to its present position may be charted. The migration pathway will be important for future prospecting and will increase the probability of locating an ore body without a prior knowledge of its existence.

An example of the type of information which can be obtained from the process of this invention is given below for the hypothetical case illustrated in the drawings. A grid pattern is established for an area including original outcrop 10, pathway 11 and present position 12. Total life dosage of radiation for each sample is then determined using the natural thermoluminescence curve of the samples compared to a series of curves obtained after irradiation of the samples at a series of radiation levels. The present total radiation activity and the present gamma radiation activity are then determined for each sample using shielded and unshielded dosimeters. The results for the situation illustrated in the drawings are tabulated below in Table 1.

TABLE 1

Hypothetical Results from Quartz-Dosimetry Survey

| Ordinate | B | | | C (Abscissa) | | | E | | |
|---|---|---|---|---|---|---|---|---|---|
| | Q | UD | SD | Q | UD | SD | Q | UD | SD |
| 4 | | | | | | | | | |
| 5 | H | D | D | H | D | D | H | H | D |
| 6 | HH | D | D | HH | D | D | HH | HH | D |
| 7 | H | D | D | H | D | D | H | H | D |
| 8 | | | | | | | | | |

Q = Quartz Total Life Dose
UD = Unshielded Dosimeter Dose Rate
SD = Shielded Dosimeter Dose Rate
H = High Radiation
D = Detectable Radiation As seen in Table 1, the location of the uranium is indicated by the high reading obtained for total present rate of radiation, whereas the pathway of the uranium is indicated by the high level of lifetime radiation dose with a lower current level of radiation.

The information obtained by the process of this invention can be supplemented by other prospecting tools such as chemical analysis of samples, radiation detectors, etc.

We claim:
1. A method of prospecting for radioactive material comprising:
   (a) obtaining a plurality of samples from a prospective formation in a predetermined pattern;
   (b) determining the natural thermoluminescent activity of said samples;
   (c) irradiating said samples at a plurality of known levels;
   (d) determining the thermoluminescent activity of said samples after each of said irradiations; and
   (e) comparing the natural thermoluminescence of said samples against the thermoluminescence after said plurality of irradiations at known levels to determine the actual level of natural irradiation to which said samples have been exposed.

2. The method of claim 1 wherein radiation dosimeters are placed in said prospective formation in a pattern corresponding to said predetermined pattern from which said plurality of samples are obtained, and said radiation dosimeters are analyzed to determine the current radiation level in said formation.

3. The method of claim 2 wherein both shielded and unshielded dosimeters are utilized at sample locations.

4. The method of claim 1 wherein the current level of alpha and beta radiation and the current level of gamma radiation are determined by utilizing unshielded dosimeters and dosimeters shielded to exclude alpha and beta radiation.

5. The method of claim 4 wherein the total natural radiation, the present total rate of alpha, beta and gamma radiation and the present rate of gamma radiation for said samples are analyzed to correlate present radiation activity with historical radiation activity.

* * * * *